United States Patent [19]

Ohsawa

[11] Patent Number: 4,748,627
[45] Date of Patent: May 31, 1988

[54] SEMICONDUCTOR MEMORY DEVICE WITH AN ERROR CORRECTION FUNCTION

[75] Inventor: Takashi Ohsawa, Kawasaki, Japan

[73] Assignee: Kabushiki Kaisha Toshiba, Kawasaki, Japan

[21] Appl. No.: 841,436

[22] Filed: Mar. 19, 1986

[30] Foreign Application Priority Data

Mar. 20, 1985 [JP] Japan .................................. 60-56515

[51] Int. Cl.[4] .............................................. G11C 7/00
[52] U.S. Cl. ...................................... 371/38; 371/21; 371/13; 365/222
[58] Field of Search .................... 371/13, 38, 5, 21; 365/222, 201, 195, 200; 364/200, 900

[56] References Cited

U.S. PATENT DOCUMENTS

| | | | |
|---|---|---|---|
| 4,319,356 | 3/1982 | Kocol | 371/13 |
| 4,380,812 | 2/1983 | Ziegler | 371/13 |
| 4,412,314 | 10/1983 | Proebsting | 371/13 |
| 4,493,081 | 1/1985 | Schmidt | 371/13 |
| 4,506,362 | 3/1985 | Morley | 371/13 |
| 4,528,665 | 7/1985 | Burns | 371/13 |
| 4,542,454 | 9/1985 | Brcich | 371/13 |

OTHER PUBLICATIONS

Japanese Patent Application No. 59-251108.

*Primary Examiner*—Michael R. Fleming
*Attorney, Agent, or Firm*—Finnegan, Henderson, Farabow, Garrett and Dunner

[57] ABSTRACT

Memory cell data is read out from memory cell arrays by a column decoder/sense amplifier in a data refresh mode. The data read out by the column decoder/sense amplifier is supplied to a decoding/correction circuit to be subjected to error detection. If an error is detected, the error data is corrected by the correction circuit. The corrected data is again supplied to the column decoder/sense amplifier, and the data held in the column decoder/sense amplifier is rewritten in an original memory cell, thus performing data refresh and error correction operations. In the refresh mode, addresses for selecting memory cells are automatically generated inside a memory device by an internal address generating means consisting of a pulse generator for generating a pulse signal in accordance with a column address strobe signal and a row address strobe signal and of a counter circuit for counting the pulse signal. The data read out in the data read mode is not corrected by the correction circuit. The access time of the memory cells is equal to that of the cells used in conventional memory devices.

11 Claims, 9 Drawing Sheets

F I G. 2
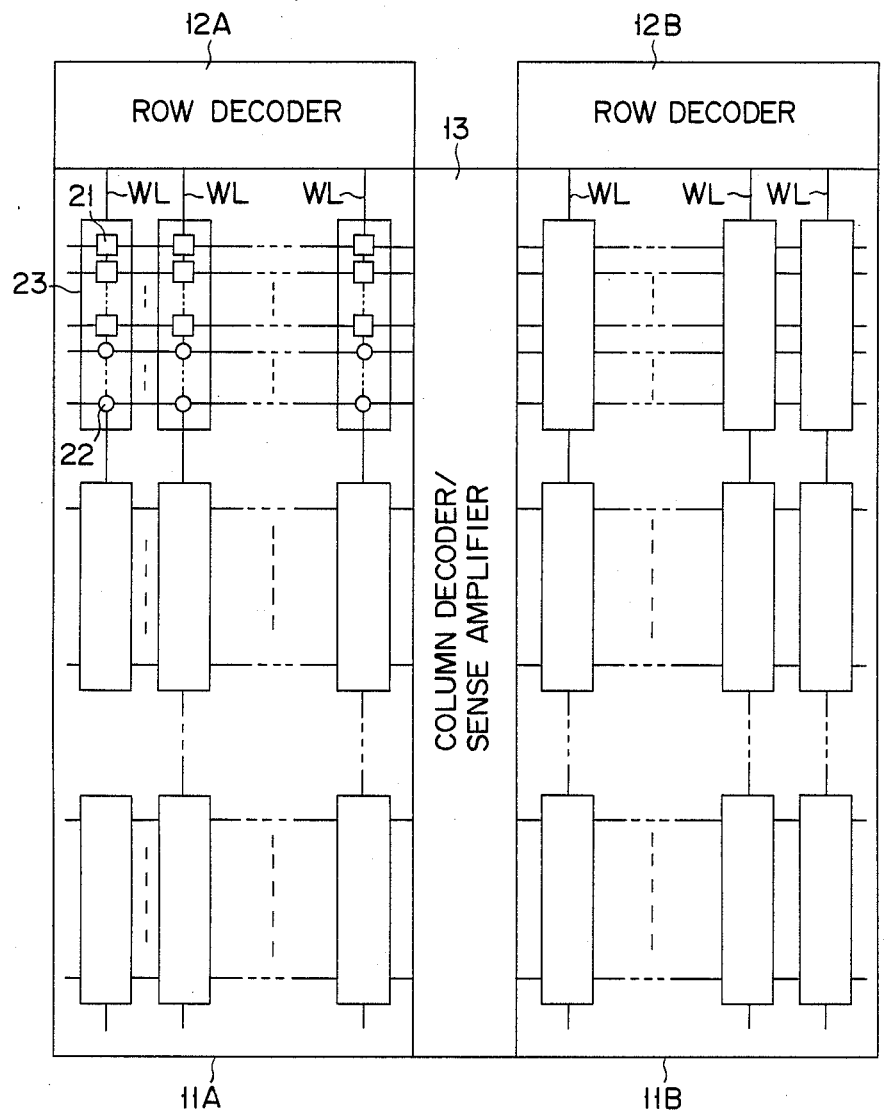

F I G. 5
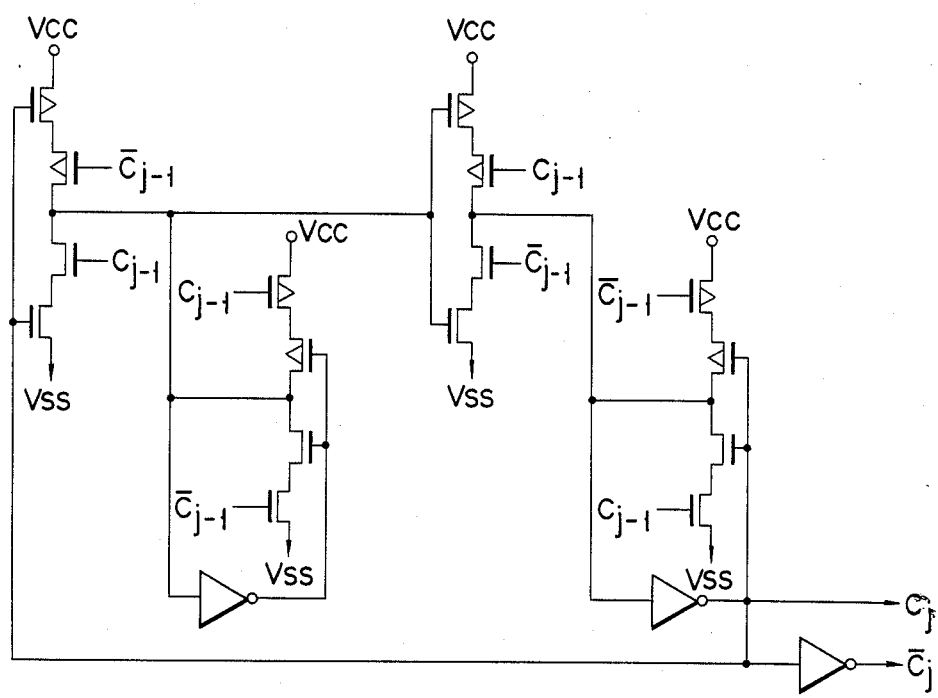

F I G. 12
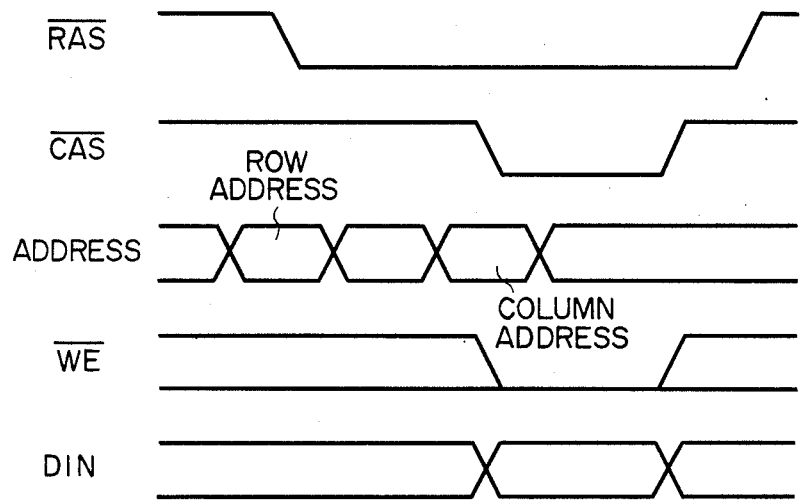
F I G. 13
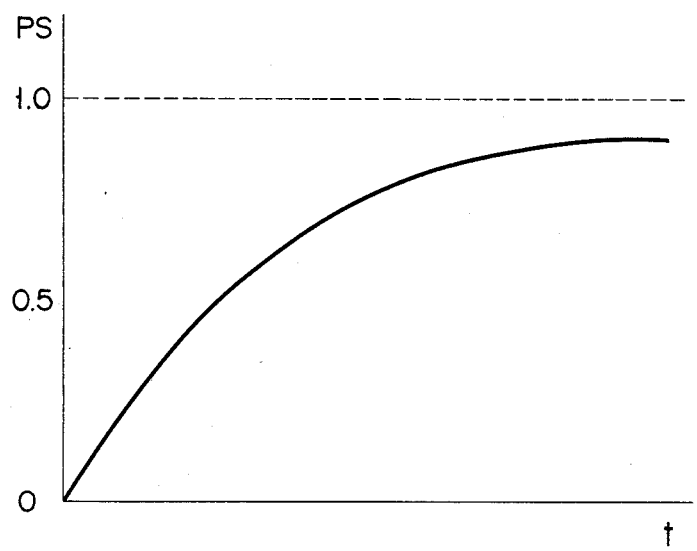

SEMICONDUCTOR MEMORY DEVICE WITH AN ERROR CORRECTION FUNCTION

BACKGROUND OF THE INVENTION

The present invention relates to a semiconductor memory device wherein a data storage circuit including a memory cell and an error correction circuit for correcting error data caused by soft errors are formed on a single semiconductor chip and, more particularly, to a semiconductor memory device with an error correction function used in a computer which can reliably prevent storage of data errors.

Semiconductor memory devices with a function for detecting erroneous data storage and correcting the detected errors have not yet been mass-produced. Currently, the only such semiconductor memory devices are test samples. These devices detect and correct data errors in accordance with various methods. Basically, each device comprises one or more redundant-bit memory cells in addition to a given number of memory cells. In a data write mode, error correction data calculated by a given rule is written in advance not only in a memory cell group for storing normal data but also in the redundant-bit memory cell. Furthermore, in a data read mode, storage data in the memory cell group corresponding to an input address and in the redundant-bit memory cell arranged corresponding thereto are read out therefrom and checked. If no error occurs in the storage data in the memory cell group, the data is output without being modified, and if an error occurs, the data is corrected and then output.

Such a conventional semiconductor memory device has the following drawbacks.

First, such a method for checking memory cell for storage data errors in the data read mode only degrades reliability. In this method, in a memory cell which has not been subjected to a data readout operation for a long period of time after the data was written therein, data errors occur increasingly often. Therefore, data errors easily occur in more memory cells than the number of bits which can be corrected by an error correction circuit.

A second drawback of the conventional memory device is prolonged data write/read period. In the data write mode, data is written in normal data storage memory cells, and at the same time, error correction data calculated by a correction circuit must be written in the redundant-bit memory cell in the identical word block. Furthermore, in the data read mode, data respectively read out from the memory cell group and the redundant-bit memory cell are checked by a decoder. If error data is found, it must be corrected by the correction circuit. Thus, extra time in the data read/write modes prevents realization of high-speed computers.

SUMMARY OF THE INVENTION

The present invention has been made in consideration of the above situation, and has as its object to provide a semiconductor memory device with an error correction function, which can prevent accumulation of storage data errors due to soft errors, and has a short data-read access time like a normal storage device with no error correction function.

According to the present invention, there is provided a semiconductor memory device comprising: a memory cell array: data read/write means for reading out storage data from the memory cell array in data read, write and refresh modes, and for rewriting data thereafter; data output means directly connected to the data read/write means for outputting, to an external circuit, data which is read out from the data read/write means and not subjected to error detection/correction; and error detection/correction means connected to the data read/write means for causing the readout data from the data read/write means to be subjected to error detection/correction and for supplying the error-corrected data to the data read/write means as rewritten data in the data read and refresh modes.

Furthermore, according to the present invention, there is provided a semiconductor memory device comprising: a memory cell array consisting of a plurality of memory cells arranged in a matrix in X and Y directions; internal address generating means for generating a Y direction address based on an X direction address for selecting the memory cell array in a refresh mode; data read/write means for reading out storage data from a given memory cell in the memory cell array which is designated by a pair of X and Y direction addresses, and for rewriting data thereafter; and error detection/correction means connected to the data read/write means for causing the readout data from the data read/write means to be subjected to error detection/correction, and for supplying the error-corrected data to the data read/write means as rewritten data.

BRIEF DESCRIPTION OF THE DRAWINGS

FIG. 2 is a detailed circuit diagram of a memory cell array in the device shown in FIG. 1;

FIG. 5 is a detailed circuit diagram of a binary counter constituting the counter circuit of FIG. 4;

FIG. 12 is a timing chart of the device in FIG. 1 in a data write mode;

FIG. 13 is a graph showing characteristics of the device of the present invention;

DETAILED DESCRIPTION OF THE PREFERRED EMBODIMENT

Figure 1:
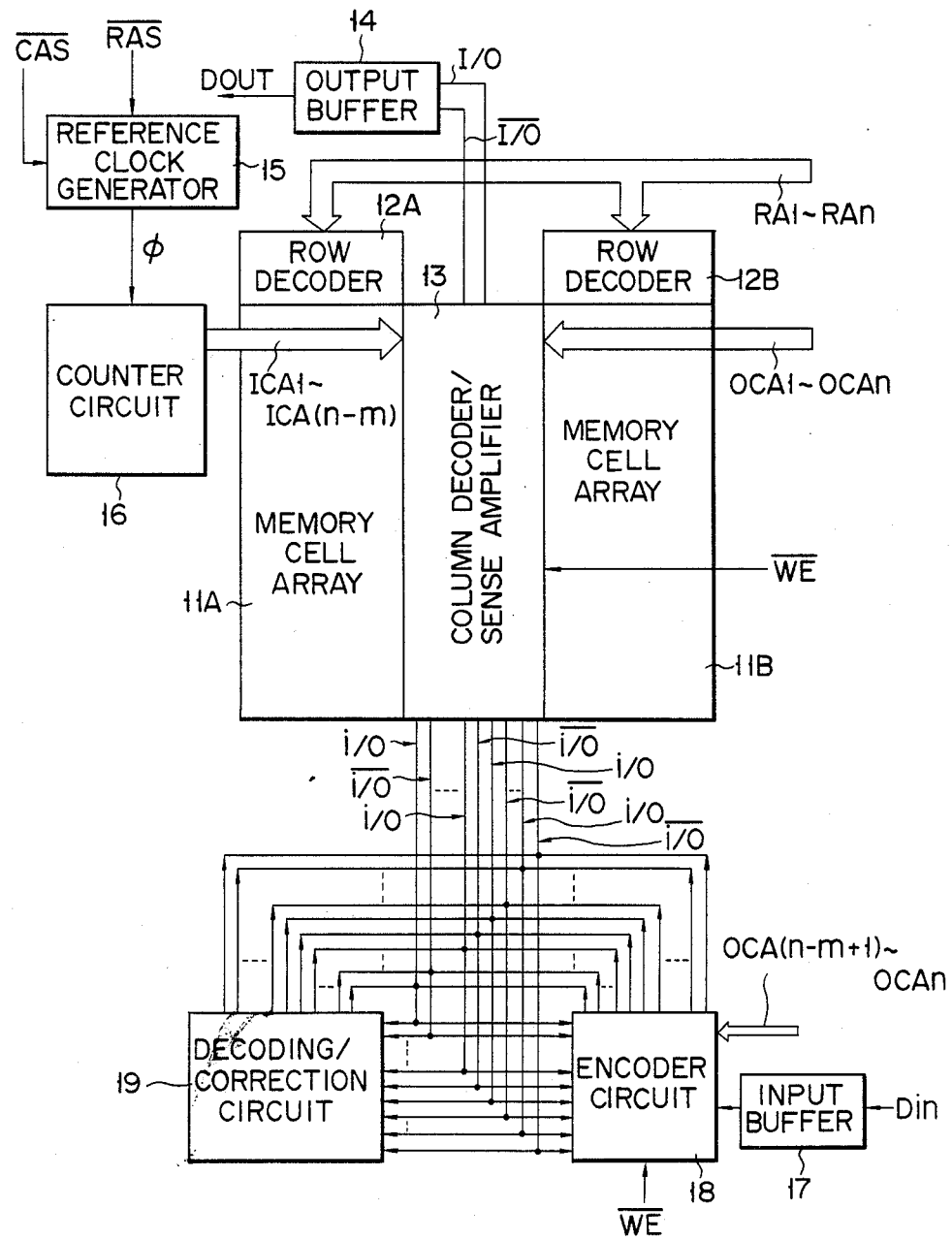
FIG. 1 is a block diagram of a semiconductor memory device according to an embodiment of the present invention.

FIG. 1 is a block diagram showing an overall arrangement when the present invention is applied to a dynamic RAM. In FIG. 1, reference numerals 11A and 11B denote memory cell arrays, each consisting of a plurality of memory cells arranged in matrix in row and column directions. Reference numerals 12A and 12B are row decoders for selecting a column of memory cells from memory cell arrays 11A and 11B in response to n-bit row addresses RA1 to RAn input from an external circuit. Reference numeral 13 denotes a column decoder/sense amplifier which selects one or more memory cells from a column selected by row decoder 12A or 12B in response to n-bit column addresses OCA1 to OCAn input from an external circuit or (n−m)-bit internal column addresses ICA1 to ICA(n−m), and performs the data read/write operation with respect to the selected memory cells. Reference numeral 14 denotes an output buffer which externally outputs, as data Dout, 1 bit of data read out from memory cell arrays 11A and 11B by amplifier 13 in the data read mode. Reference numeral 15 denotes a reference clock generator for generating reference clock signal $\phi$ based on row-address strobe signal $\overline{RAS}$ and column address strobe signal $\overline{CAS}$. Reference numeral 16 denotes a counter circuit which counts reference clock signal $\phi$ generated from generator 15 to produce (n−m)-bit internal column addresses ICA1 to ICA(n−m). Reference numeral 17 denotes an input buffer to which input data Din to be written is supplied. Reference numeral 18 denotes an encoder circuit to which output data from input buffer 17 and upper bits OCA(n−m+1) to OCAn of n-bit column addresses OCA1 to OCAn are supplied in the data write mode. Reference numeral 19 denotes a decoding/correction circuit which performs decoding processing based on data read out by amplifier 13, and corrects the readout data if an error is detected therein. Circuits 18 and 19 are connected to amplifier 13 through $(2^m+1)$ pairs of data input/output lines i/o and $\overline{i/o}$. Note that circuit 18, for example, calculate data in check bit to determine whether the odd or even number of data is at HIGH level. Circuit 19 also performs data encoding and correction like circuit 18.

Amplifier 13 and circuits 18 receive write enable signal $\overline{WE}$. Circuit 18 is activated when signal $\overline{WE}$ is at LOW level.

FIG. 2 is a detailed circuit diagram of memory cell arrays 11A and 11B together with row decoders 12A and 12B, and column decoder/sense amplifier 13. When the present invention is applied to a dynamic RAM, addresses are multiplexed, and row and column addresses are supplied through an identical input terminal. For this reason, the bit numbers of the row and column address must inevitably be the same. For example, when the row and column addresses have an n-bit configuration, $2^n \times 2^n$ memory cells for storing normal data are arranged in the row and column directions. Therefore, memory cells 21 for storing normal data indicated by squares in FIG. 2 are arranged in a $2^n \times 2^n$ matrix in the row and column directions. $2^{2n}$ memory cells 21 as a whole are provided in memory cell arrays 11A and 11B. Memory cells 21 of each column are commonly connected to one of $2^n$ word lines WL. Furthermore, l memory cells 22 for storing the check bit, indicated by circles in FIG. 2, are provided to each $2^m$ memory cells 21 connected to given word line WL. $2^m$ memory cells 21 and l memory cells 22 constitute each word block 23. Therefore, the total number of memory cells in memory cell arrays 11A and 11B is $2^{2n}+2^{2n-m} \times l$.

In this memory device, when row-address strobe signal $\overline{RAS}$ goes to LOW level to input row addresses RA1 to RAn in the data refresh mode, (n−m)-bit internal column addresses ICA1 to ICA(n−m) are automatically generated by counter circuit 16. At the same time, a plurality of word blocks 23 on given word line WL, which is selected by row decoders 12A and 12B in accordance with externally input row addresses RA1 to RAn, are selected, and data stored in selected blocks 23 is read out by sense amplifier 13 and sensed thereby. Next, data in one word block 23 is selected from those in selected word blocks 23 read out by amplifier 13 in accordance with addresses ICA1 to ICA(n−m). More specifically, storage data in $2^m$ memory cells 21 in one word block 23 and that in memory cells 22 in identical block 23 are read out. The $(2^m+1)$-bit data is supplied to circuit 19 through $(2^m+1)$ pairs of data input/output lines i/o and $\overline{i/o}$. Thereafter, circuit 19 performs error correction processing. Error-corrected data is again input to amplifier 13 through lines i/o and $\overline{i/o}$, and is written in respective cells in original block 23.

Amplifier 13 is connected to a pair of data input/output lines I/O and $\overline{I/O}$ used in a normal data read mode, in addition to lines i/o and $\overline{i/o}$. In the data read mode, after row addresses RA1 to RAn are input, strobe signal $\overline{CAS}$ is set at LOW level, and column addresses OCA1 to OCAn are input to a chip in sync therewith. A plurality of word blocks 23 on given word line WL in memory cell arrays 11A and 11B (which is selected by row decoders 12A and 12B in accordance with addresses RA1 to RAn) are selected simultaneously, and storage data therein is read out and sensed by amplifier 13. Data in one memory cell 21 in one word block 23 is selected from those in selected word blocks 23 read out by amplifier 13 in accordance with input addresses OCA1 to OCAn. More specifically, data in one memory cell 21 in one word block 23 is selected, and the selected data is supplied to output buffer 14 through lines I/O and $\overline{I/O}$, and is output therefrom as data Dout.

The operation of the memory device with the above arrangement will now be described in detail.

The memory device of this embodiment consists of three basic operation modes, i.e., refresh, data read, and data write modes.

Figure 3:
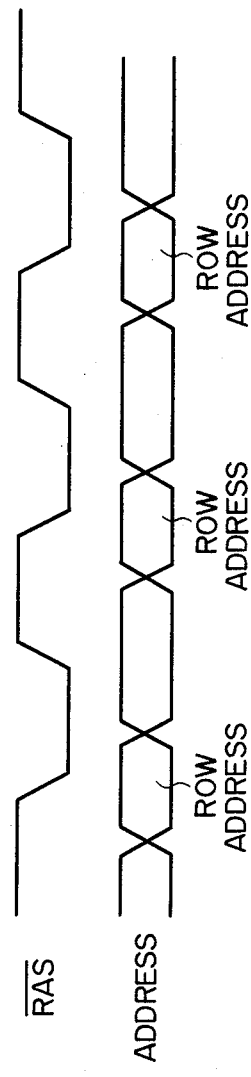
FIG. 3 is a timing chart of the device of the present invention in a refresh mode.

In the refresh mode, data in memory cells in arrays 11A and 11B is refreshed, while error detection/correction of storage data is performed at the same time. The data refresh operation is performed as shown in FIG. 3, such that strobe signal $\overline{RAS}$ is set at LOW level and addresses A1 to An are input to n address input terminals in synchronism therewith. More specifically, addresses cyclically input to the input terminals and row addresses RA1 to RAn are fetched in the chip at the trailing edge of signal $\overline{RAS}$. Row decoders 12A and 12B select one of $2^n$ word lines WL in accordance with the input addresses and raise a potential of selected word line WL. Thus, arrays 11A and 11B supply to amplifier 13 data in a plurality of word blocks 23 on HIGH-level word line WL. Amplifier 13 senses the input data and then writes sensed data in the original memory cells. With this operation, data can be refreshed.

When all word lines WL are selected within predetermined time T, first word line WL is again selected. Note that time T must be shorter than a time within which a signal charge accumulated in each memory cell decreases by a slight level which cannot be sensed by the sense amplifier. Therefore, in the dynamic RAM, the refresh operation is performed during an interval between or during the data read or write operations. In this embodiment, in addition to the refresh operation, one of a plurality of word blocks 23 on selected word line WL in the refresh mode is selected, and the cell data therein is supplied to circuit 19 through lines i/o and $\overline{i/o}$. Circuit 19 forms correct word data and writes it in the original memory cell. In this way, data in one word block can be corrected simultaneously with data refresh.

In this case, the row addresses are cyclically generated by an external circuit (e.g., a counter circuit). For this reason, all word lines WL are selected once per cycle. And, all $2^n + 2^{n-m} \times 1$ memory cells in a plurality of word blocks 23 on one word line WL must be sequentially selected for every $2^m + 1$ memory cells corresponding to one word to be error-corrected. In this case, the column address requires (n−m) bits. Since this column address is not input from an external circuit, it must be generated in the chip itself.

Such column addresses ICA1 to ICA(n−m) are generated from reference clock generator 15 and counter circuit 16. Generator 15 generates reference clock signal $\phi$ at every leading edge of strobe signal $\overline{RAS}$. Circuit 16 counts signal $\phi$ to produce (n−m)-bit column addresses ICA1 to ICA(n−m).

Figure 4:
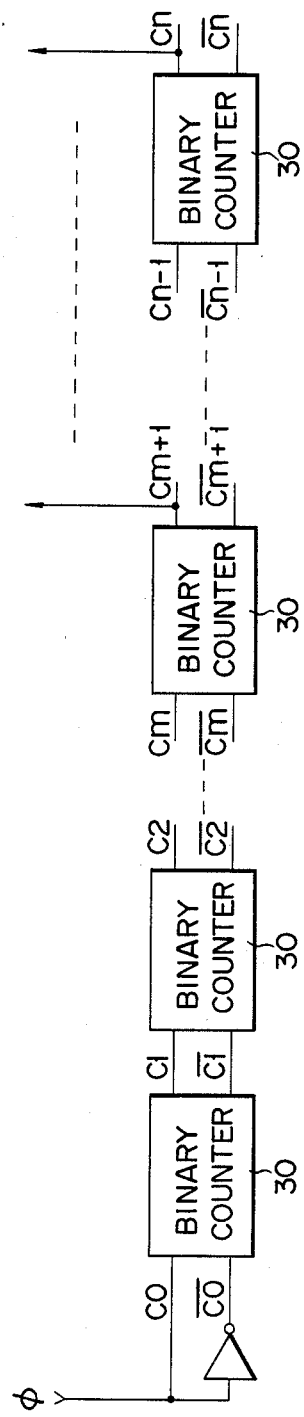
FIG. 4 is a detailed circuit diagram of a counter circuit of the device of the present invention.

FIG. 4 shows a detailed arrangement of counter circuit 16. Circuit 16 consists of a multi-staged series circuit of (2n−m) binary counters 30, and receives signal $\phi$ by counter 30 at the first stage. With this arrangement, upper (n−m-bit count output signals Cm+1 to Cn are produced as column addresses ICA1 to ICA(n−m). Note that binary counter 30 as shown in FIG. 5 is known to those skilled in the art. Referring to FIG. 5, reference symbols Cj−1 and $\overline{Cj-1}$ denote count output signals from counter 30 at the immediately preceding stage; and Cj and $\overline{Cj}$, count output signals from counter 30 at this stage.

Figure 6:
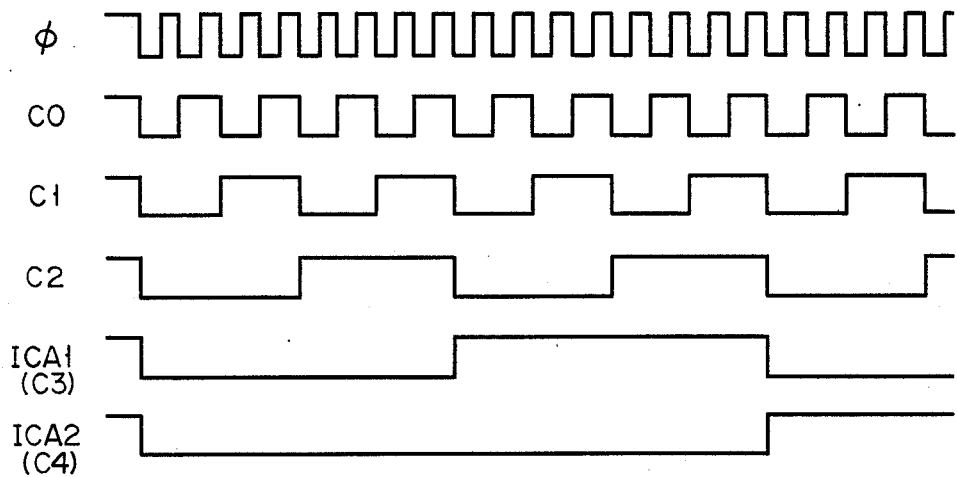
FIG. 6 is a timing chart of the counter circuit of FIG. 4.
Figure 7:
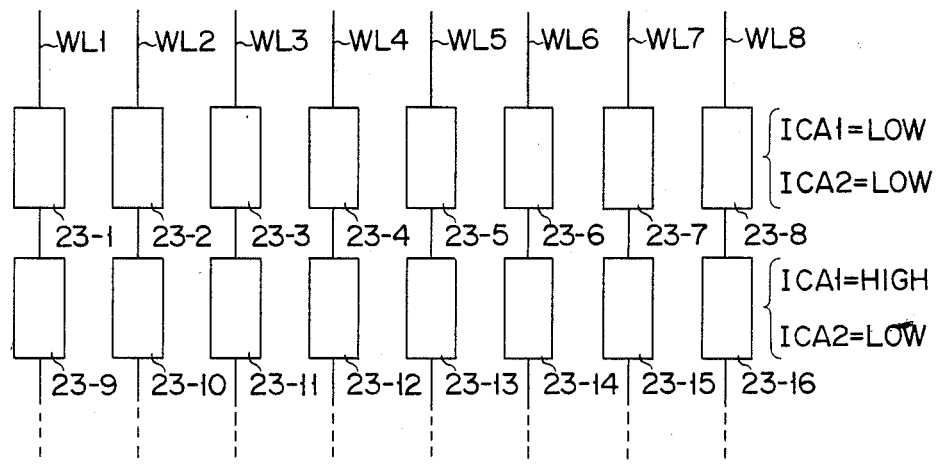
FIG. 7 is a circuit diagram showing a state where a word block in the counter circuit of FIG. 4 is selected.

FIG. 6 is a timing chart when n=4 and m=1 in the counter circuit in FIG. 4, and 5 binary counters are used. In this case, internal column addresses ICA1 and ICA2 (2 bits) shown in FIG. 6 are input to amplifier 13. Since internal column addresses ICA1 and ICA2 have 2 bits, 4 combinations of levels thereof can be accomplished. More specifically, ICA1=ICA2=LOW, ICA1=HIGH and ICA2=LOW, ICA1=LOW and ICA2=HIGH, and ICA1=ICA2=HIGH. Meanwhile, when n=4 and m=1, 8 word lines WL1 to WL8 are provided in memory cell arrays 11A and 11B, and 4 word blocks 23, each including two normal data storage memory cells, are provided along each word line WL. The total number of word blocks is 32. In this case, row addresses RA1 to RA3 (3 bits) are cyclically input from outside the chip at the trailing edge of strobe signal $\overline{RAS}$. Combinations of levels of 2-bit internal addresses ICA1 and ICA2 are changed every 9th trailing edge of signal $\overline{RAS}$. Therefore, as shown in FIG. 6, addresses ICA1 and ICA2 are at LOW levels until the 9th trailing edge of signal $\overline{RAS}$. Until that point, as shown in FIG. 7, 8 word lines WL1 to WL8 are sequentially selected in accordance with 3-bit row addresses RA1 to RA3, and 8 word blocks 23-1 to 23-8, to which an identical internal column address is assigned, are sequentially selected accordingly. Address ICA1 is then kept at HIGH level and address ICA2 is kept at LOW level until the 17th trailing edge of signal $\overline{RAS}$. Until that point, 8 word blocks 23-9 to 23-16 defined by these addresses are sequentially selected. Thus, at the 32nd trailing edge of signal $\overline{RAS}$, all 32 word blocks in arrays 11A and 11B have been selected.

Figure 8:
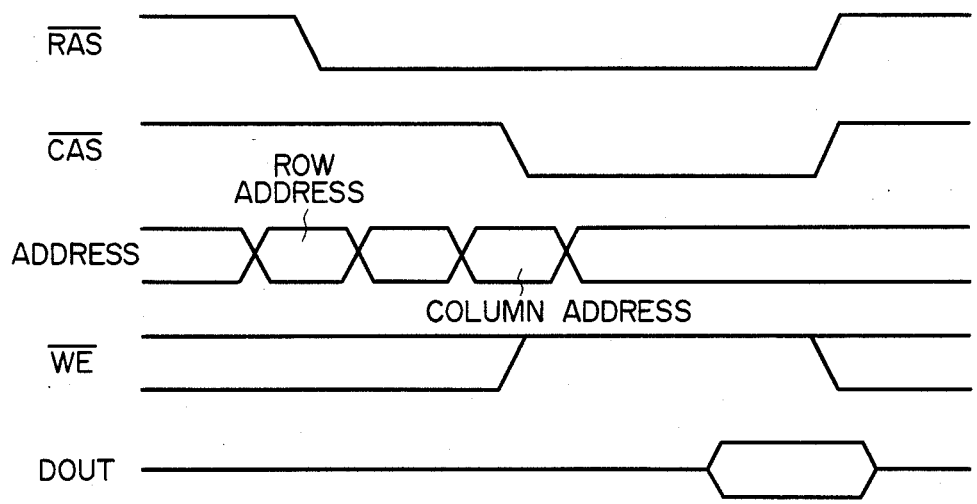
FIG. 8 is a timing chart of the device in FIG. 1 in a data read mode.

The data read operation of the dynamic RAM is performed in accordance with a timing chart shown in FIG. 8. More specifically, this operation begins such that a row address is fetched in the chip at the trailing edge of strobe signal $\overline{RAS}$, and a column address is fetched in the chip at the trailing edge of strobe signal $\overline{CAS}$. In the data read mode, write enable signal $\overline{WE}$ goes to HIGH level at a predetermined timing, and after a predetermined period of time, storage data in a given memory cell defined by a combination of the row and column addresses is produced from output buffer 14 as output data Dout. As previously described, a plurality of word blocks 23 on one word line WL in memory cell arrays 11A and 11B (which is selected by row decoders 12A and 12B in accordance with row addresses RA1 to RAn), are selected simultaneously, and storage data therein is read out and sensed by amplifier 13. Data in one memory cell 21 in one word block 23 of the selected blocks is selected in accordance with column addresses OCA1 to OCAn. Data in selected cell 21 is supplied to output buffer 14 through lines I/O and $\overline{I/O}$ and is generated therefrom as data Dout.

An error contained in readout data will be examined. In the device of this embodiment, storage data in memory cells in arrays 11A and 11B is periodically corrected using the refresh mode. Therefore, it is considered that almost no errors should be found in the readout data. In other words, it is expected that readout data errors will be found only when an α ray incident on a portion of arrays 11A and 11B near a certain cell causes a soft error in the time since the last error correction operation was performed. The probability of such a soft error is expected to be very low. In the device of this embodiment, in the data read mode, word data in one word block 23 including memory cells corresponding to row addresses RA1 to RAn and column addresses OCA1 to OCAn is subjected to error detection/correction. However, output data Dout is generated from amplifier 13 through lines I/O and $\overline{I/O}$ before the result of error detection/correction is presented. Note that in the data read mode, clock signal $\phi$ must not be generated from generator 15. Should clock signal $\phi$ be generated in this mode, counter circuit 16 is undesirably updated and this interrupts regular error detection/correction from word data subsequent to the last data processed in the previous refresh mode.

Having the above function, the device of this embodiment requires an access time in the data read mode no longer than that in a normal dynamic RAM having no error detection/correction circuit.

Figure 9:
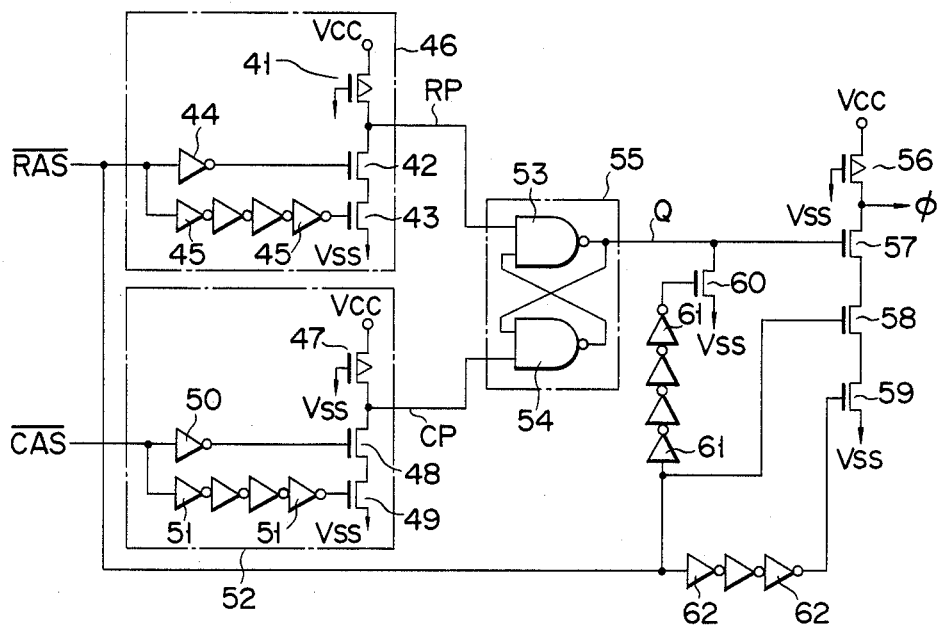
FIG. 9 is a detailed circuit diagram of a reference clock generator of the device in FIG. 1.

FIG. 9 shows a detailed arrangement of clock generator 15 which generates clock signal $\phi$ in synchronism with row address strobe signal $\overline{RAS}$ in the refresh mode, and does not generate clock signal $\phi$ in the normal data read mode. Generator 15 has the following arrangement. P-channel MOSFET (MOS field effect transistor) 41 and two N-channel MOSFETs 42 and 43 are serially connected between high potential power source Vcc and low potential power source Vss. The gate of MOSFET 41 receives potential Vss to be kept ON. The gate of MOSFET 42 receives strobe signal $\overline{RAS}$ through inverter 44. The gate of MOSFET 43 receives strobe signal $\overline{RAS}$ through an even number of inverters (e.g., a series circuit of 4 inverters) 45. These MOSFETs 41 to 43 and inverters 44 and 45 constitute pulse generator 46, which generates LOW-level pulse signal RP at the trailing edge of strobe signal $\overline{RAS}$.

Similarly, MOSFETs 47 to 49 and inverters 50 and 51 constitute pulse generator 52, which generates LOW-level pulse signal CP at the trailing edge of strobe signal $\overline{CAS}$.

Pulse signals RP and CP respectively produced from generators 46 and 52 are input to flip-flop 55 consisting of two NAND gates 53 and 54.

P-channel MOSFET 56 and three N-channel MOSFETs 57 to 59 are serially inserted between power sources Vcc and Vss. The gate of MOSFET 56 receives potential Vss to be kept ON. The gate of MOSFET 57 receives output signal Q from flip-flop 55. N-channel MOSFET 60 is connected between the gate of MOSFET 57 and power source Vss. The gate of MOSFET 60 receives strobe signal $\overline{RAS}$ through an even number of inverters (e.g., a series circuit of four inverters) 61. The gate of MOSFET 58 directly receives strobe signal $\overline{RAS}$. The gate of MOSFET 59 receives strobe signal $\overline{RAS}$ through an odd number of inverters (e.g., a series circuit of three inverters) 62. Clock signal $\phi$ is generated from a node between MOSFETs 56 and 57.

Figure 10:
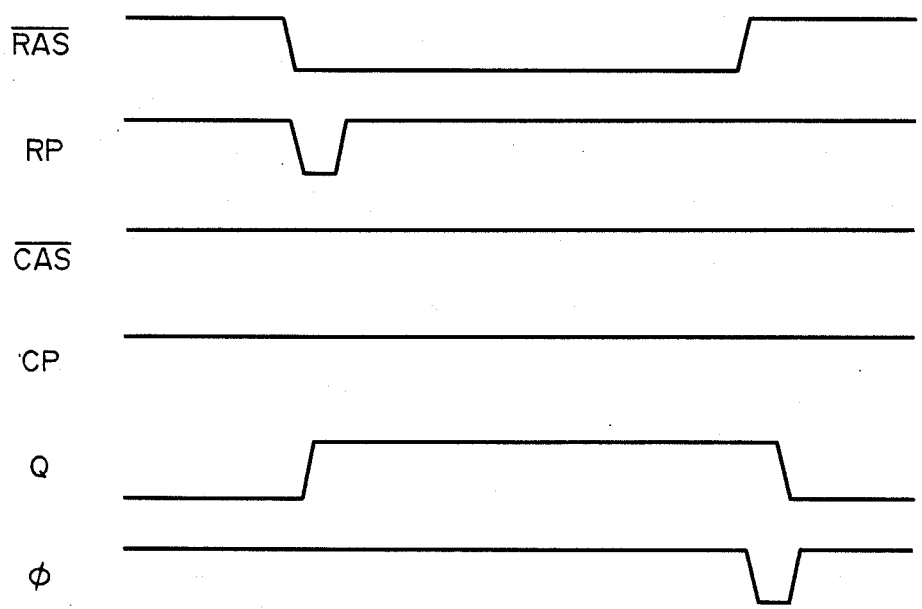
FIG. 10 is a timing chart showing an operation of the generator of the device in FIG. 1.
Figure 11:
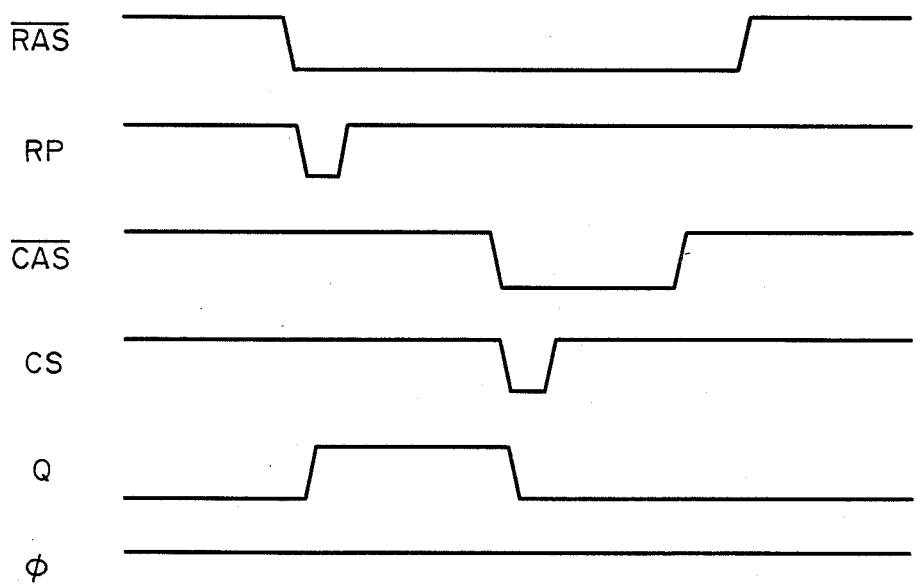
FIG. 11 is a timing chart showing another operation of the clock generator.

FIGS. 10 and 11 are timing charts showing the operation of clock generator 15 with the arrangement shown in FIG. 9.

In the timing chart of FIG. 10, only strobe signal $\overline{RAS}$ is cyclically changed, while strobe signal $\overline{CAS}$ is kept unchanged. In other words, this corresponds to the refresh mode. When signal $\overline{RAS}$ is at HIGH level, the gate input signal of MOSFET 60 is also at HIGH level. Therefore, MOSFET 60 is enabled to set output signal Q from flip-flop 55 at LOW level. When signal Q is at LOW level, MOSFET 57 is disabled, and no discharging path is formed between an output point of signal $\phi$ and power source Vss. Therefore, in the initial state where signal $\overline{RAS}$ is at HIGH level, signal $\phi$ is charged to HIGH level by MOSFET 56. When signal $\overline{RAS}$ goes to LOW level from this state, LOW-level pulse signal RP is generated from generator 46 in sync with the trailing edge of signal $\overline{RAS}$. Before signal $\overline{RAS}$ goes to LOW level, since signal CP at one input terminal of NAND gate 54 is at HIGH level and signal Q at the other input terminal thereof is at LOW level, the output signal from gate 54 is at HIGH level. For this reason, when LOW-level pulse signal RP is generated, the output signal from NAND gate 53 (i.e., signal Q) goes to HIGH level, thereby turning on MOSFET 57. On the other hand, when signal $\overline{RAS}$ goes to LOW level, MOSFET 58 is turned off, and clock signal $\phi$ is kept at HIGH level. Furthermore, MOSFET 59 is enabled at the trailing edge of signal $\overline{RAS}$.

When signal $\overline{RAS}$ then goes to HIGH level, MOSFET 58 is enabled, thus forming the discharging path between the output point of signal $\phi$ and power source Vss. The output point of signal 100 is then discharged, and signal $\phi$ goes to LOW level. The gate signal from MOSFET 59 goes to LOW level after a predetermined period of time, thereby turning off MOSFET 59. At this time, signal $\phi$ goes to HIGH level. The gate signal of MOSFET 60 goes to HIGH level to turn on MOSFET 60. Thereafter, signal Q again goes to LOW level.

In this way, generator 15 generates LOW-level clock signal $\phi$ each time signal $\overline{RAS}$ goes first to LOW level and then to HIGH level.

In the timing chart of FIG. 11, both signals $\overline{RAS}$ and $\overline{CAS}$ are changed. This corresponds to the data read mode. In this case, when signal $\overline{RAS}$ goes to LOW level as in FIG. 10, generator 46 generates pulse signal RP in sync therewith. Pulse signal RP causes output signal Q from flip-flop 55 to go to HIGH level. At the next trailing edge of strobe signal $\overline{CAS}$, pulse generator 46 generates pulse signal CP. Thus, output signal Q from flip-flop 55 again goes to LOW level, thus turning off MOSFET 57. For this reason, even though signal $\overline{RAS}$ goes to HIGH level thereafter, the output point of signal $\phi$ can no longer be discharged. That is, signal $\phi$ is kept at HIGH level. Therefore, in the data read mode, if signal $\overline{RAS}$ is changed, clock signal $\phi$ is not generated and a count of counter circuit 16 is not updated.

When word data is read out from arrays 11A and 11B and an error in the data including an accessed bit is to be detected and corrected, an external column address must have priority over an internal column address. In order to accomplish this, signal $\overline{CAS}$ for example, is used as a switching signal so as to switch column addresses from internal to external.

The data write mode will now be described with reference to a timing chart shown in FIG. 12. The data write operation in the dynamic RAM begins when a row address is fetched in the chip at the trailing edge of signal $\overline{RAS}$, and a column address is fetched at the trailing edge of signal $\overline{CAS}$. In this case, when write enable signal $\overline{WE}$ goes to LOW level, input data Din is written in a memory cell defined by the row and column addresses through input buffer 17, encoder circuit 18, and sense amplifier 13. As shown in FIG. 1, in the data write mode, a plurality of word blocks 23 on one word line WL in arrays 11A and 11B, which is selected by decoders 12A and 12B in accordance with addresses RA1 to RAn are selected, and storage data therein is read out and sensed by amplifier 13. Subsequently, data in one word block 23, including memory cells corresponding to addresses OCA1 to OCAn of the storage data in selected blocks 23 read out by amplifier 13. The output data of amplifier 13 is supplied to circuit 18 through said lines i/o and $\overline{i/o}$ after it has been subjected to the error-detection and error-correction at circuit 19. Circuit 18 selects one cell data corresponding to upper-bit addresses OCA(n−m+1) to OCAn from addresses OCA1 to OCAn from the input data, and re-writes the selected data based on other input data. Upon rewritten of the data, data of a check bit in the word data is calculated, and the calculated data is written in the check bit.

In the data write mode, after word data including memory cells specified by the external row and column addresses is read out, it must be rewritten. For this reason, a data write time is prolonged when compared to a conventional dynamic RAM having no error detection/correction function. However, the data write operation in a dynamic RAM has no access time, unlike the data read operation. More specifically, the data write time is defined only by a cycle time from when signal $\overline{RAS}$ is set at LOW level until the next data read or write operation begins. Note that this cycle time has a relatively wide margin. Therefore, it can considered that overall, the cycle time is not prolonged when compared with that of the conventional dynamic RAM. In the data write mode, the circuit shown in FIG. 9 or one equivalent thereto is operated. More specifically, since signal $\phi$ is not generated, internal column addresses ICA1 to ICA(n−m) are not changed by counter circuit 16.

In a conventional memory device wherein word data accessed in the data read mode is corrected, correct data can be output unless the number of errors exceeds the number of bits which can be corrected by an allocated error detection/correction function. However, in such a memory device, the data read time is inevitably delayed. In contrast to this, in the device of this embodiment, since data accessed in the data read mode is output without being subjected to error correction, the data read time is not delayed. In this method, correct data can be read out unless a soft error occurs upon irradiation of an $\alpha$ ray between the time the data is corrected in the refresh mode and the time it is next read out. It is assumed that the number of soft errors in identical word data will not exceed an error correction limit.

A data error probability in the device of this embodiment will now be quantitatively analyzed. Since the device of this embodiment corrects data in the refresh mode, the following operation is assumed. The refresh operation is performed with respect to a single memory cell at each time tc (correction time). If data error is found during this operation, it is corrected. The data write operation is performed at each time tw (write time), and the data read operation is performed between two data write operations.

Probability Pe of data error caused by soft errors is expressed by:

$$Pe = Ps(1-Rc) \qquad 1$$

where Ps is a probability of soft errors occurring in a memory cell, Rc is a probability of data corrected if a soft error occurs, and Ps is determined by a critical charge for determining HIGH and LOW levels of data in the memory cell, by an impurity concentration profile in a semiconductor substrate immediately under the memory cell, by the flux of an $\alpha$ ray, and by the like. The value of Rc is determined by the capacity of an error detection/correction function adopted in the chip.

In the device of this embodiment, a soft error occurs upon irradiation of an $\alpha$ ray between the time an accessed memory cell is corrected and the time it is next read-accessed. Therefore, Rc=1 cannot be obtained although the number of errors in identical word data is assumed not to exceed the capacity of error correction.

When data is written in a cell and the cell is left unchanged for time t, Ps is given by the following equation 2 (note that FIG. 13 shows these characteristics):

$$Pe = 1 - e^{-\beta t} \qquad 2$$

where $\beta$ is a probability of soft errors in a cell occuring in a unit time.

Meanwhile, Rc, tc, and tw have the following relationships:

$$Rc = \tfrac{1}{2} + (\tfrac{1}{4})(tw/tc) \quad (tw < 2tc) \qquad 3$$

$$Rc = \tfrac{1}{2} + (\tfrac{1}{4})\{(tw-tc)/tw\}(tw \geq 2tc) \qquad 4$$

Figure 14:
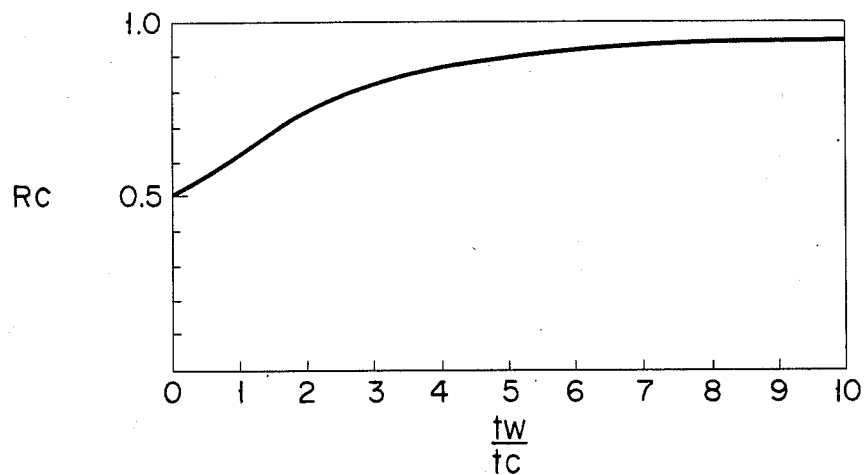
FIG. 14 is a graph showing characteristics different from those in FIG. 13.

These relationships are shown in the graph in FIG. 14.

$\beta$ is expressed by known parameters. More specifically, in a memory device which has no correction circuit (i.e., Rc=0), and has N memory cells, after time T has passed, a value of $\beta$ is determined such that data in F cells are wrong. From equations 1 and 2, and Rc=0, equation 5 is established:

$$F/N = 1 - e^{-\beta T} \qquad 5$$

When equation 5 is solved for $\beta$, we obtain:

$$\beta = \ln\{1-(F/N)\}^{-1/T} \qquad 6$$

If probability Pe of data error in data read time ($t=tw/2$) is calculated using equations 1, 2, and 3, equation 7 is established under an assumption of $F/N \ll 1$:

$$\begin{aligned}Pe &= (1 - e^{-\beta tw/2}) \cdot (1 - Rc) \\ &= \{1 - (\tfrac{1}{4}) \cdot (tw/tc)\}(tw/tc) \cdot \overline{Pe}/4 \; (tw < 2tc) \\ &= \overline{Pe}/4 \; (tw \geq 2tc)\end{aligned} \qquad 7$$

Note that $\overline{Pe}$ in equation 7 is a probability of readout data error occurring when data is written by a memory device without an error correction circuit, and is read out after time tc has passed. $\overline{Pe}$ is expressed by equation 8:

$$\overline{Pe} = (F/N) \cdot (tc/T) \qquad 8$$

Figure 15:
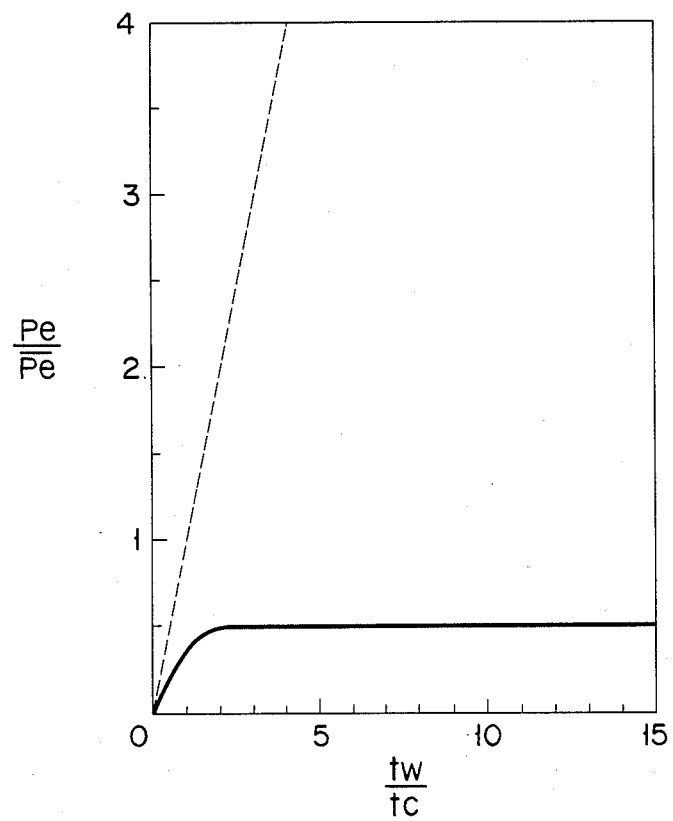
FIG. 15 is a graph comparing the device of the present invention and a conventional device.

FIG. 15 shows the relationship between tw/tc and Pe normalized by $\overline{Pe}$. In FIG. 15, a function indicated by a broken line is obtained such that probability Pe of readout data errors occurring after time tw/tc has passed from when the data was written by a conventional memory device having no error correction circuit, which is normalized by $\overline{Pe}$. A slope of this function is 1. In this case, the error probability increases upon increase in tw/tc. In contrast to this, with the device of this embodiment, even if tw/tc increases, the error probability is not increased within the range of tw/tc$\geq$2. Therefore, the error probability is lower than that in the conventional device irrespective of tw/tc. In particular, when tw/tc is large, the device of this embodiment can provide a significant effect.

Note that the present invention is not limited to the above embodiment, and various changes and modifications may be made within the spirit and scope of the invention. For example, in the above embodiment, the present invention is applied to a dynamic RAM. In general, a dynamic RAM requires a refresh operation so as to recover lost storage data due to leakage of a charge accumulated in cells constituted by small capacitors. In the refresh mode, row addresses are periodically and cyclically supplied to raise a potential of word lines. Thereby, storage data in the cells at an identical row address is sensed by a sense amplifier to be temporarily latched, and is rewritten in the original cell to refresh the data. Therefore, the error correction operation can be easily performed together with the refresh operation. However, in a static RAM which needs no refresh operation, if row addresses are periodically and cylically supplied, an operation for correcting an error in word data having a given number of bits can be performed independently in addition to the data read and write operations, without using a refresh operation.

According to the present invention as described above, a semiconductor memory device which can prevent storage data errors due to soft errors from being accumulated and has a data read time, no longer than that of a normal memory device having no error correction function, can be provided.

What is claimed is:

1. A semiconductor memory device comprising:
a memory cell array;
data read/write means for reading out storage data from said memory cell array in data read, data write, and refresh modes, and rewriting data thereafter;
data output means directly connected to the data read/write means for outputting, to an external circuit, data which is read out by said data read/write means and not subjected to error detection/correction; and error detection/correction means connected to the data read/write means for causing the readout data from said data read/write means to be subjected to error detection/correction and for supplying the error-corrected data to said data read/write means as rewritten data in the data read and refresh modes.

2. A semiconductor memory device comprising:
a memory cell array consisting of a plurality of memory cells arranged in a matrix in X and Y directions;
internal address generating means for generating a Y direction address based on an X direction address for selecting said memory cell array in a refresh mode;
data read/write means for reading out storage data from a given memory cell in said memory cell array which is designated by a pair of the X and Y direction addresses, and for rewriting data thereafter;
data output means directly connected to the data read/write means for outputting, to an external circuit, data which is read out by said data read/write means and not subjected to error detection/correction; and
error detection/correction means connected to the data read/write means for causing the readout data from said data read/write means to be subjected to error detection/correction, and for supplying the error-corrected data to said data read/write means as rewritten data.

3. A semiconductor memory device comprising:
a memory cell array consisting of a plurality of memory cells arranged in a matrix in X and Y directions;
internal address generating means for generating a Y direction address based on an X direction address for selecting said memory cell array in a refresh mode;
data read/write means for reading out storage data from a given memory cell in said memory cell array which is designated by a pair of the X and Y direction addresses, and for rewriting data thereafter in the refresh mode;
data output means directly connected to the data read/write means for outputting, to an external circuit, data which is read out by said data read/write means and not subjected to error detection/correction;
error detection/correction means connected to the data read/write means for detecting and correcting errors found in the data read from said data read/write means, in a data read, write and refresh modes, and for supplying the error-corrected data to said data read/write means as rewritten data, in the data read and refresh modes; and
encoding means connected to the data read/write means for supplying the data obtained by rewriting the error-corrected data supplied from said error detection/correction means based on externally input data, and for generating a check bit based on the data obtained by said rewriting, in the data write mode.

4. A device according to claim 2, wherein said internal address generating means comprises:
a pulse generator which generates a pulse signal when a level of only a row address strobe signal is changed during an external-address input period, and does not generate the pulse signal when levels of both row and column address strobe signals are changed; and
a counter circuit for counting the pulse signal generated from the pulse generator so as to generate said Y direction address.

5. A device according to claim 3, wherein said internal address generating means comprises:
a pulse generator which generates a pulse signal when a level of only a row address strobe signal is changed during an external-address input period, and does not generate the pulse signal when levels of both row and column address strobe signals are changed; and
a counter circuit for counting the pulse signal generated from the pulse generator so as to generate said Y direction address.

6. A device according to claim 4, wherein said counter circuit consists of a series circuit of a plurality of binary counters, and an output signal from upper-bit binary counters is generated as said Y direction address.

7. A device according to claim 5, wherein said counter circuit consists of a series circuit of a plurality of binary counters, and an output signal from upper-bit binary counters is generated as said Y direction address.

8. A device according to claim 6, wherein said memory cell array comprises a plurality of word blocks, each consisting of at least one memory cell for storing normal data and at least one memory cell for storing a check bit, and said error detection/correction means performs the data error detection/correction operation in word block unit.

9. A device according to claim 7, wherein said memory cell array comprises a plurality of word blocks, each consisting of at least one memory cell for storing normal data and at least one memory cell for storing a check bit, and said error detection/correction means performs the data error detection/correction operation in word block units.

10. A device according to claim 8, wherein said memory cells are arranged in $2^{nx}$ rows extending in the X-direction and $2^{ny}$ columns extending in the Y direction, each of said word blocks has $2^m$ memory cells, where $0 \leq m \leq ny$, and said counter circuit has $(nx+ny-m)$ binary counters, the output signals of upper $(ny-m)$ binary counters being used as said Y direction address, wherein x, y, n, and m are non-negative integers.

11. A device according to claim 9, wherein said memory cells are arranged in $2^{nx}$ rows extending in the X-direction and $2^{ny}$ columns extending in the Y-direction, each of said word blocks has $2^m$ memory cells, where $0 \leq m \leq ny$, and said counter circuit has $(ny+ny-m)$ binary counters, the output signals of upper $(ny-m)$ binary counters being used as said Y direction address, wherein x, y, n, and m are non-negative integers.

* * * * *